US012663258B2

(12) United States Patent
Nagashima et al.

(10) Patent No.: US 12,663,258 B2
(45) Date of Patent: Jun. 23, 2026

(54) DEFECT DETECTION DEVICE AND DEFECT DETECTION METHOD

(71) Applicant: SHIMADZU CORPORATION, Kyoto (JP)

(72) Inventors: Tomotaka Nagashima, Kyoto (JP); Takahide Hatahori, Kyoto (JP); Kenji Takubo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 18/075,419

(22) Filed: Dec. 6, 2022

(65) Prior Publication Data

US 2023/0304787 A1 Sep. 28, 2023

(30) Foreign Application Priority Data

Mar. 25, 2022 (JP) ................................. 2022-050304

(51) Int. Cl.
G01B 9/02 (2022.01)
G01H 1/14 (2006.01)
(52) U.S. Cl.
CPC .......... G01B 9/02095 (2013.01); G01H 1/14 (2013.01)
(58) Field of Classification Search
CPC ...................................................... G01B 9/02
See application file for complete search history.

(56) References Cited

U.S. PATENT DOCUMENTS 10,794,836 B1 * 10/2020 Flynn ................. G01B 9/02002
2009/0122306 A1 * 5/2009 Ohashi ............... G01N 21/3563
356/237.5
2013/0329953 A1 * 12/2013 Schreier ................. G06T 7/579
382/103
2017/0350690 A1 12/2017 Hatahori et al.
2019/0204275 A1 * 7/2019 Hatahori ............ G01N 29/0654

FOREIGN PATENT DOCUMENTS

JP 2017219318 12/2017

OTHER PUBLICATIONS

Tutorial on Wavenumber Transforms of structural Vibration Fields, Hambric, 2018 (Year: 2018).*
"Office Action of Japan Counterpart Application", issued on Jul. 1, 2025, with English translation thereof, pp. 1-6.
"Office Action of China Counterpart Application", issued on Dec. 15, 2025, with English translation thereof, p. 1-p. 15.

* cited by examiner

*Primary Examiner* — Jennifer D. Carruth
(74) *Attorney, Agent, or Firm* — JCIPRNET

(57) ABSTRACT

In a defect detection device (10), an exciter (11) gives a test object (S) a vibration with a variable frequency. A vibration state measurer (15, 163) performs a measurement of the vibration state of the surface of the test object by an optical means while the vibration is given to the test object, and determines, for each position on the surface, a numerical value representing the vibration state based on a result of the measurement. A judgment-index-value determiner (164) determines a judgment index value by Fourier transform based on the numerical value representing the vibration state at each position, where the judgment index value is a numerical value representing a strength of the vibration for each wavenumber. A wavenumber-wavelength determiner (165) determines, based on the judgment index value determined for each wavenumber, a wavenumber or wavelength of an elastic wave induced in the test object by the vibration.

5 Claims, 5 Drawing Sheets

REAL SPACE

WAVENUMBER SPACE

DEFECT DETECTION DEVICE AND DEFECT DETECTION METHOD

CROSS-REFERENCE TO RELATED APPLICATION

This application claims the priority benefit of Japanese application serial no. 2022-050304, filed on Mar. 25, 2022. The entirety of the above-mentioned patent application is hereby incorporated by reference herein and made a part of this specification.

BACKGROUND

Technical Field

The present invention relates to a defect detection device and defect detection method for detecting a defect which is present on or in an object to be examined (which is hereinafter called a "test object").

Description of Related Art

A defect detection method which employs speckle interferometry or speckle-shearing interferometry has conventionally been proposed (for example, see Patent Literature 1). In speckle interferometry, a beam of laser light from a laser light source is split into illumination light and reference light, and the illumination light is cast onto a test area. The illumination light reflected at each point on the surface of a test object within the test area is combined with the reference light to obtain an interference pattern. In speckle-shearing interferometry, the laser beam from the laser light source is cast onto the test area (with no reference light split from the beam), and an interference pattern is obtained from two rays of light reflected from two points located close to each other on the surface of the test object within the test area. In the device and method described in Patent Literature 1, a vibrator is held in contact with the test object and energized to produce vibrations, whereby an elastic wave is continuously induced in the test object. Meanwhile, a displacement in an "off-plane direction" (the direction perpendicular to a plane) of each point (in the case of the speckle interferometry), or a relative displacement in the off-plane direction between two points located close to each other (in the case of the speckle-shearing interferometry), at a specific phase of the elastic wave is measured, using a stroboscopic illumination which is repeatedly turned on, being synchronized with the elastic wave. This measurement operation is performed at least at three different phases of the sinusoidal elastic wave. Based on the thereby obtained data, the entire vibration state of the elastic wave can be reproduced in the form of a graphical image. Based on a spatial change of the vibration state in this image, a defect within the test area can be detected.

If the wavelength of the elastic wave is too long, it will be difficult to detect a defect from the image showing the entire vibration state of the elastic wave since the defect will be entirely included in one peak or trough in the elastic wave and only an insufficient spatial change in the amplitude of the wave will occur at the defect. Conversely, too short a wavelength of the elastic wave will also make it difficult to detect a defect since commonly used vibrators have the characteristic that the amplitude of the elastic wave which can be induced in a test object decreases with the wavelength. Therefore, it is necessary to set the number of vibrations (oscillation frequency) of the vibrator so that the elastic wave induced in the test object falls within an appropriate range where the wavelength of the wave is not too long as compared to the size of the defect expected to be present in the test object while its amplitude is not too small.

The wavelength $\lambda$ of the elastic wave which occurs in the test object satisfies the relationship expressed by $f \cdot \lambda = v$, where f is the frequency of the vibration given from the vibrator to the test object, and v is the speed of the elastic wave in the test object. The speed v of the elastic wave changes depending on the material of the test object, although it also changes depending on the mode of the propagation of the elastic wave in the test object, which is determined by the shape (e.g., plate-like, bulk-shaped or tubular) and other features of the object. For example, giving a vibration to a bulk-shaped test object from a vibrator held in contact with the surface of the object is likely to induce a surface acoustic wave (Rayleigh wave) which is propagated within a limited region near the surface of the test object. When the frequency f of the given vibration is the same, the surface acoustic wave thus induced is propagated at a lower speed v than an elastic wave propagated within the entire region in the depth direction of the test object. For this reason, even when the frequency f and the material of the test object are previously known, the wavelength $\lambda$ of the elastic wave to be induced in the test object cannot be directly determined from those pieces of information.

To address this problem, an operation has conventionally been performed in which an operator visually determines the wavelength of the elastic wave from an image in which the entire vibration state of the elastic wave is reproduced, and changes the frequency given to the test object if that wavelength is not within an appropriate range.

CITATION LIST

Patent Literature

Patent Literature 1: JP 2017-219318 A

In a test object, the elastic wave is reflected at an end face or other locations in the object. If the shape of the test object is not symmetrical, the elastic wave will exhibit a complex form due to the mixture of the reflections from various directions. It is difficult for an operator to visually determine the wavelength of the elastic wave from an image of an elastic wave having such a complex form.

SUMMARY

The problem to be solved by the present invention is to provide a defect detection device and method which facilitates the task of checking the wavelength of the elastic wave induced in a test object and thereby enables an easy determination of a suitable frequency of the vibrator for the detection of a defect in the test object.

A defect detection device according to the present invention developed for solving the previously described problem includes:

an exciter configured to give a test object a vibration with a variable frequency;

a vibration state measurer configured to perform a measurement of a vibration state of the surface of the test object by an optical means while the vibration is given to the test object, and to determine, for each position on the surface, a numerical value representing the vibration state based on a result of the measurement;

a judgment-index-value determiner configured to determine a judgment index value by Fourier transform based on the numerical value representing the vibration state at each position, where the judgment index value is a numerical value representing the strength of the vibration for each wavenumber; and a wavenumber-wavelength determiner configured to determine, based on the judgment index value determined for each wavenumber, a wavenumber or wavelength of an elastic wave induced in the test object by the vibration given to the test object.

A defect detection method according to the present invention includes:

a vibration-giving process for giving a test object a vibration of a predetermined frequency;

a vibration state measurement process for performing a measurement of a vibration state of the surface of the test object by an optical means while the vibration is given to the test object, and for determining, for each position on the surface, a numerical value representing the vibration state based on a result of the measurement;

a judgment-index-value determination process for determining a judgment index value by Fourier transform based on the numerical value representing the vibration state at each position, where the judgment index value is a numerical value representing the strength of the vibration for each wavenumber;

a wavenumber-wavelength determination process for determining, based on the judgment index value determined for each wavenumber, a wavenumber or wavelength of the elastic wave induced in the test object by the vibration given to the test object; and a determination process for determining whether or not the wavenumber or wavelength determined in the wavenumber-wavelength determination process is within an appropriate range, based on the wavenumber or wavelength as well as the size of a defect expected to be present in the test object, where, when it is determined in the determination process that the wavenumber or wavelength is not within an appropriate range, the aforementioned processes are once more performed after the frequency is changed.

In the defect detection device and method according to the present invention, a numerical value representing the vibration state is determined for each position on the surface of the test object. Based on the numerical value thus determined for each position, a judgment index value which is a numerical value representing the strength of the vibration for each wavenumber is determined. Based on the judgment index value thus determined for each wavenumber, the wavenumber of the elastic wave induced in the test object (e.g., the wavenumber at which the judgment index value is has the largest value), or a wavelength which is the reciprocal of that wavenumber, is determined. By this method, the wavenumber or wavelength of the elastic wave can be easily determined regardless of the form of the elastic wave created in the test object. When the wavenumber or wavelength of the elastic wave thus determined is within an appropriate range, a defect can be correctly detected from the vibration state of the surface of the test object produced by the elastic wave having that wavenumber or wavelength. When the wavenumber or wavelength of the elastic wave thus determined is not within the appropriate range, the frequency of the vibration given to the test object can be modified so that the wavenumber or wavelength will be within the appropriate range and the defect will be correctly detected.

DESCRIPTION OF THE EMBODIMENTS

Figure 1:
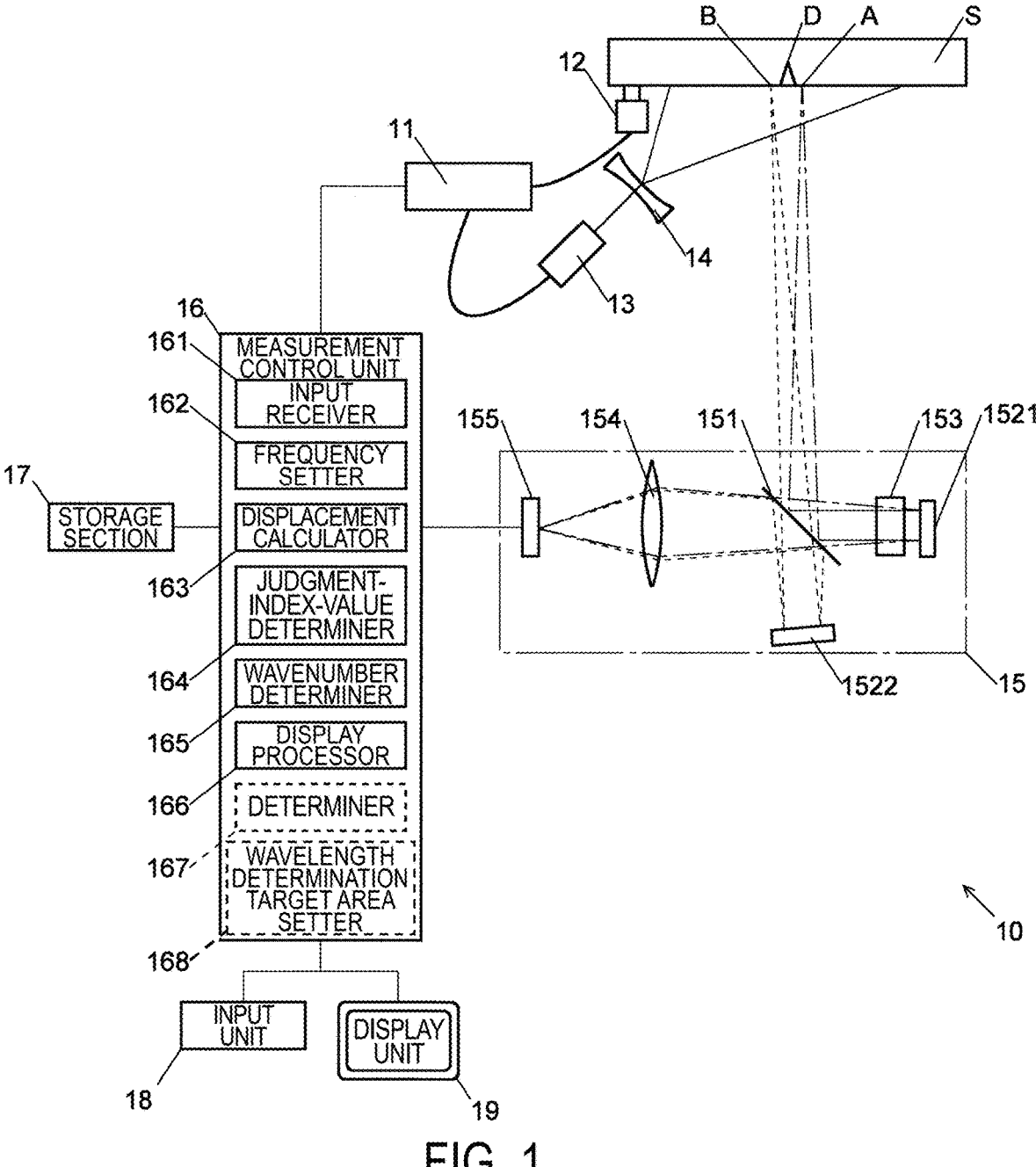
FIG. 1 is a schematic configuration diagram showing one embodiment of the defect detection device according to the present invention.

An embodiment of the defect detection device and method according to the present invention is hereinafter described using FIGS. 1-8.

(1) Configuration of Defect Detection Device According to Present Embodiment The present defect detection device 10 includes a signal generator 11, vibrator 12, pulse laser light source 13, illumination light lens 14, speckle-shearing interferometer 15, measurement control unit 16, storage unit 17, input unit 18 and display unit 19.

The signal generator 11, which is connected to the vibrator 12 by a cable, generates an AC electric signal and sends it to the vibrator 12. The frequency of this AC electric signal can be varied and will be set by the measurement control unit 16, as will be described later. When in use, the vibrator 12 is held in contact with a test object S, receives the AC electric signal from the signal generator 11 and converts it into a mechanical vibration having the aforementioned frequency (number of vibrations), to give the mechanical vibration to the test object S. In this manner, an elastic wave having the frequency set by the measurement control unit 16 is induced in the test object S. The signal generator 11 and the vibrator 12 correspond to the aforementioned exciter.

The signal generator 11 is also connected with the pulse laser light source 13 by a cable separate from the cable connected to the vibrator 12. The signal generator 11 sends a pulsed electric signal (pulse signal) to the pulse laser light source 13 at a timing when the AC electric signal is at a predetermined phase. The predetermined phase and the thereby determined timing are set by the measurement control unit 16, as will be described later. The pulse laser light source 13 is a light source configured to emit pulse laser light upon receiving a pulse signal from the signal generator 11. The illumination light lens 14 is a concave lens located between the pulse laser light source 13 and the test object S. The illumination light lens 14 serves to expand the pulse laser light from the pulse laser light source 13 onto the entire measurement area on the surface of the test object S. The pulse laser light source 13 and the illumination light lens 14 form a system for illuminating the surface of the test object S in a stroboscopic manner.

The speckle-shearing interferometer 15 includes a beam splitter 151, first reflector 1521, second reflector 1522, phase shifter 153, converging lens 154 and image sensor 155. The beam splitter 151 is a half mirror located at a position where it can receive the illumination light reflected by the measurement area on the surface of the test object S. The first reflector 1521 is located on the optical path of the illumination light reflected by the beam splitter 151, while the second reflector 1522 is located on the optical path of the illumination light passing through the beam splitter 151. The phase shifter 153, which is located between the beam splitter 151 and the first reflector 1521, is configured to change (shift) the phase of the light passing through the phase shifter 153. The image sensor 155 is located on an optical path which is common to both the illumination light which is initially reflected by the beam splitter 151 and subsequently by the first reflector 1521 to ultimately pass through the beam splitter 151, and the illumination light which initially passes through the beam splitter 151 and is subsequently reflected by the second reflector 1522 to be ultimately reflected by the beam splitter 151. The converging lens 154 is located between the beam splitter 151 and the image sensor 155.

The first reflector 1521 is arranged so that its reflecting surface is at an angle of 45 degrees to the reflecting surface of the beam splitter 151. On the other hand, the second reflector 1522 is arranged so that its reflecting surface is slightly tilted from the angle of 45° to the reflecting surface of the beam splitter 151. Due to this arrangement of the first reflector 1521 and the second reflector 1522, the illumination light (indicated by the long dashed short dashed line in FIG. 1) which is reflected by point A on the surface of the test object S and also by the first reflector 1521 hits the same point on the image sensor 155 as the illumination light (indicated by the broken line) which is reflected by point B, which is slightly displaced from point A on the surface, and also by the second reflector 1522, whereby interference of light occurs. The image sensor 155, which has a large number of detection elements, detects rays of light coming from a large number of points (represented by point A mentioned earlier) on the surface of the test object S and falling onto the image sensor 155 via the first reflector 1521 and the phase shifter 153, with each ray of light detected by a different detection element. The same also applies to point B: each of the rays of light coming from a large number of points and falling onto the image sensor 155 via the second reflector 1522 is detected by a different detection element.

The input unit 18, which is a keyboard, mouse, touch panel or a combination of two or more of those devices, is an input device for allowing an operator to enter predetermined kinds of information. The display unit 19 is a display device for displaying an image of an elastic wave induced on the surface of the test object S and related pieces of information, such as the wavelength of the static wave which is determined as will be described later.

The measurement control unit 16 includes an input receiver 161, frequency controller 162, displacement calculator 163, judgment-index-value determiner 164, a wavenumber determiner (wavenumber-wavelength determiner) 165 and display processor 166 as its functional blocks. The measurement control unit 16 is embodied by a central processing unit (CPU) and other related hardware devices as well as a software product for executing the related operations. The components (functional blocks) of the measurement control unit 16 are hereinafter described.

The input receiver 161 receives various kinds of information entered by the operator using the input unit 18, such as the value or range of the frequency to be set by the frequency controller 162 or parameters to be used for displaying an image on the display unit 19, and sends those pieces of information to the frequency controller 162, display processor 166 or other related components.

The frequency controller 162 controls the frequency of the AC electric signal sent from the signal generator 11 to the vibrator 12, i.e., the number of vibrations of the elastic wave to be induced in the test object S by the vibrator 12. When a value of the frequency (number of vibrations) has been entered by the operator using the input unit 18, the frequency controller 162 sets the frequency of the AC electric signal at that value. When a frequency range has been set by the operator using the input unit 18, the frequency controller 162 controls the frequency of the AC electric signal so as to vary the frequency over a plurality of values within that range, and consequently, to vary the number of vibrations of the elastic wave induced in the test object S over a plurality of values, thereby allowing for the determination of the wavenumber at each of the plurality of values of the number of vibrations, as will be described later.

The displacement calculator 163 performs the operation of determining the displacement in the off-plane direction at each position on the surface of the test object S, using the speckle-shearing interferometer 15, based on the detection signal obtained from each detection element of the image sensor 155. A numerical value which represents the displacement in the off-plane direction at each position corresponds to the "numerical value representing the vibration state" mentioned earlier. The combination of the speckle-shearing interferometer 15 and the displacement calculator 163 corresponds to the vibration state measurer mentioned earlier.

The judgment-index-value determiner 164 performs the operation of determining a judgment index value, which is a numerical value representing the strength of the vibration for each wavenumber, by Fourier transform, based on the numerical value of the displacement at each position obtained by the displacement calculator 163. Since the position is represented by a two-dimensional coordinate system, the Fourier transform yields a numerical strength value for each wavenumber expressed as a two-dimensional vector (which is hereinafter called the "vector-valued wavenumber"). For the Fourier transform performed by the judgment-index-value determiner 164, the technique of fast Fourier transform can be used, which is commonly used for processing data on a computer.

In the present embodiment, the judgment-index-value determiner 164 further performs the operation of calculating, as the judgment index value, a numerical value of the strength of each scalar-valued wavenumber by totaling the strength values obtained for each vector-valued wavenumber and located at the same distance from the origin of the two-dimensional wavenumber vector space. Determining the judgment index value for each scalar-valued wavenumber (the length of the wavenumber vector) in this manner is advantageous in that, when a plurality of elastic waves having the same wavelength in the real space are travelling in a plurality of directions due to the reflections at the end faces (and other locations) in the test object, the strength value at the wavenumber corresponding to the wavelength concerned is obtained by totaling the strengths of the wave in those directions, whereby a high strength value is obtained, which facilitates the determination of the wavelength. It should be noted that it is also possible to directly use the strength value of each vector-valued wavenumber as the judgment index value instead of determining the judgment index value for each scalar-valued wavenumber in the previously described manner.

The wavenumber determiner 165 performs the operation of determining, as the wavenumber of the elastic wave induced in the test object S, the scalar-valued wavenumber having the largest judgment index value among the judgment index values of the scalar-valued wavenumbers determined by the judgment-index-value determiner 164.

The display processor 166 performs the process of displaying images in the display device of the display unit 19, such as an image of an elastic wave shown on a real space or an image showing the distribution of the judgment index value of each wavenumber on a wavenumber space. In the case of the image of an elastic wave, the numerical value determined by the displacement calculator 163 for representing the magnitude of the displacement in the off-plane direction at each position on the surface of the test object S is converted into a pixel value of the image, and the pixel is displayed at the corresponding position on the display device of the display unit 19. In the case of the image showing the distribution of the judgment index value, the magnitude of the judgment index value at each point on the two-dimensional wavenumber space with the x and y axes representing the two components $k_x$ and $k_y$ of the two-dimensional wavenumber vector, respectively, is converted into a pixel value of the image, and the pixel is displayed at the corresponding position on the display device of the display unit 19. In addition to, or in place of, an image showing the judgment index value on the two-dimensional wavenumber space in this manner, a graph may be displayed, with the horizontal axis representing the scalar-valued wavenumber and the vertical axis representing the judgment index value. The display processor 166 further performs the process of displaying, on the display device of the display unit 19, the reciprocal of each wavenumber determined by the wavenumber determiner 165, as the wavelength of the elastic wave induced on the surface of the test object S. Additionally, when the operator using the input unit 18 has performed an operation for giving an instruction for resizing the image or for showing a scale which indicates the size on the image, the display processor 166 performs the process of displaying or altering the image according to the instruction.

The storage section 17 is used to store various data and values, such as the measurement data including the strength values of the detection signal obtained from each detection element of the image sensor 155, the value of the displacement in the off-plane direction at each position calculated by the displacement calculator 163, the strength values determined for each of the vector-valued and scalar-valued wavenumbers by the judgment-index-value determiner 164, as well as the wavenumber of the elastic wave determined by the wavenumber determiner 165.

Figure 2:
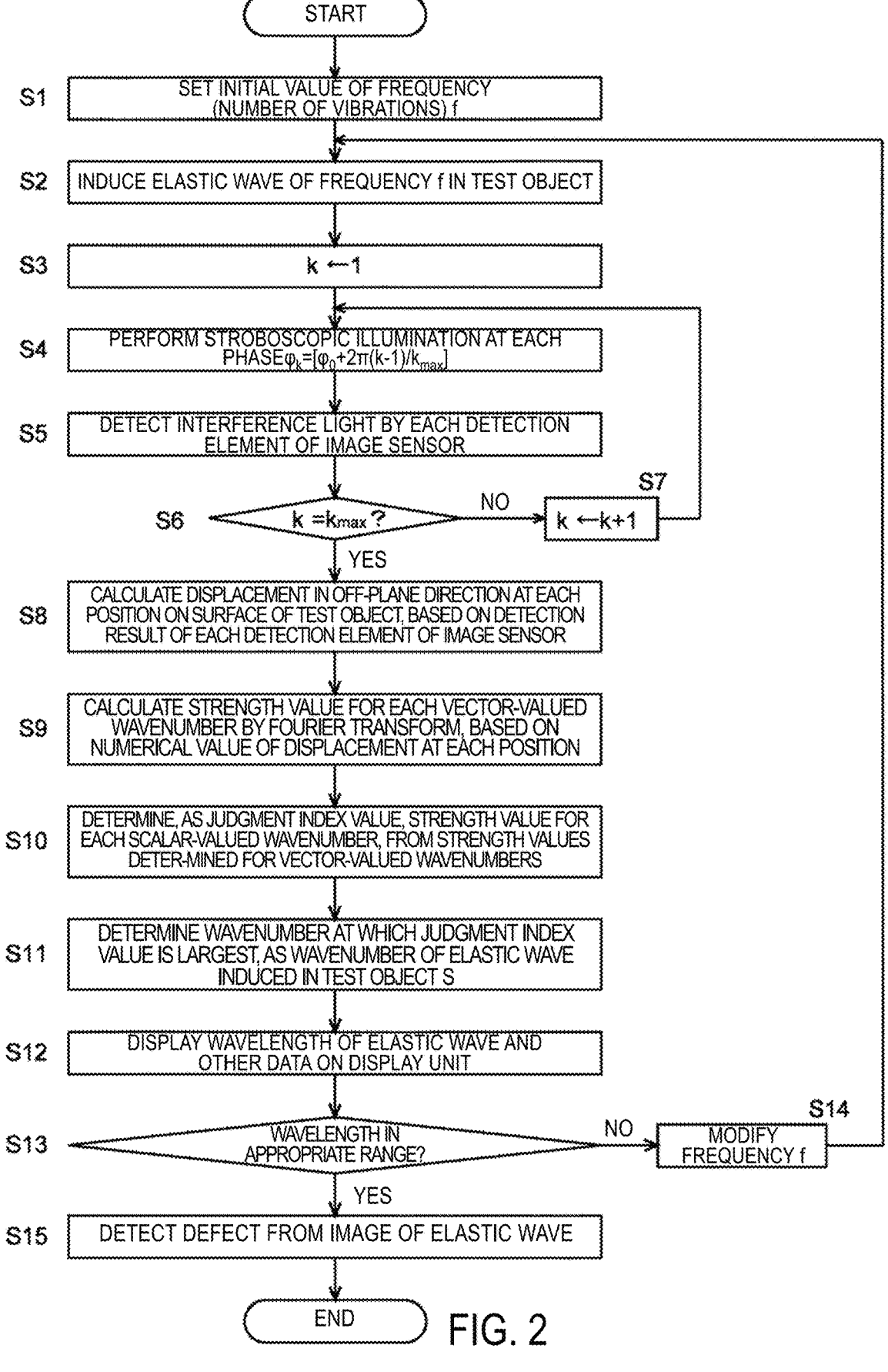
FIG. 2 is a flowchart showing an operation of the defect detection device according to the present embodiment and the defect detection method according to the present embodiment.

(2) Operation of Defect Detection Device According to Present Embodiment, and Defect Detection Method According to Present Embodiment Referring to the flowchart of FIG. 2, an operation of the defect detection device 10 according to the present embodiment and the defect detection method according to the present embodiment are hereinafter described.

An operator places a test object S at a predetermined position in the defect detection device 10 and brings the vibrator 12 into contact with the test object S. Subsequently, the operator performs a predetermined operation using the input unit 18, whereby a sequence of operations is initiated.

Initially, the frequency controller 162 performs the operation of setting the initial value of the frequency f of the AC electric signal to be sent from the signal generator 11 to the vibrator 12, i.e., the number of vibrations to be given to the test object S (Step S1). The initial value of the frequency (number of vibrations) may be entered by the operator using the input unit 18, or the resonance frequency of the vibrator 12 may be applied. It is also possible to perform a preliminary measurement while varying the frequency of the AC electric signal, and to use a frequency at which the amplitude of the elastic wave induced in the test object S is equal to or larger than a predetermined amplitude.

Next, the frequency controller 162 operates the signal generator 11 so as to send the AC electric signal having the set initial value of frequency f to the vibrator 12 and cause the vibrator 12 to vibrate, whereby a vibration of frequency f is given to the test object S. By this operation, an elastic wave of frequency f is induced in the test object S (Step S2).

In this state, the displacement in the off-plane direction at each point on the surface of the test object S is measured at each of the $k_{max}$ phases which are different from each other (where $k_{max}$ is an integer equal to or greater than three) by the following method. The $k_{max}$ phases are hereinafter expressed by $\phi_k = \phi_0 + 2\pi(k-1)/k_{max}$, where $\phi_0$ is an appropriate initial value (e.g., $\phi_0 = 0$) and k is an integer from 1 to $k_{max}$. Initially, the value of k is set to 1 (Step S3), and the signal generator 11 sends a pulse signal to the pulse laser light source 13 at each timing when the phase of the elastic wave is equal to $\phi_1$ ($= \phi_0$). The pulse laser light source 13 repeatedly emits illumination light, or pulse laser light, every time it receives the pulse signal (stroboscopic illumination). This illumination light is expanded by the illumination light lens 14 and cast onto the entire measurement area on the surface of the test object S (Step S4).

The illumination light is reflected on the surface of the test object S and enters the beam splitter 151 in the speckle-shearing interferometer 15. A portion of this illumination light is reflected by the beam splitter 151 and passes through the phase shifter 153. After being reflected by the first reflector 1521, the same light once more passes through the phase shifter 153, and a portion of this light passes through the beam splitter 151 and falls onto the image sensor 155. The remaining portion of the illumination light which entered the beam splitter 151 for the first time passes through the beam splitter 151. After being reflected by the second reflector 1522, a portion of this light is reflected by the beam splitter 151 and falls onto the image sensor 155. In the image sensor 155, each of the rays of illumination light reflected by a large number of points on the surface of the test object S is individually detected by a different detection element.

Figure 3:
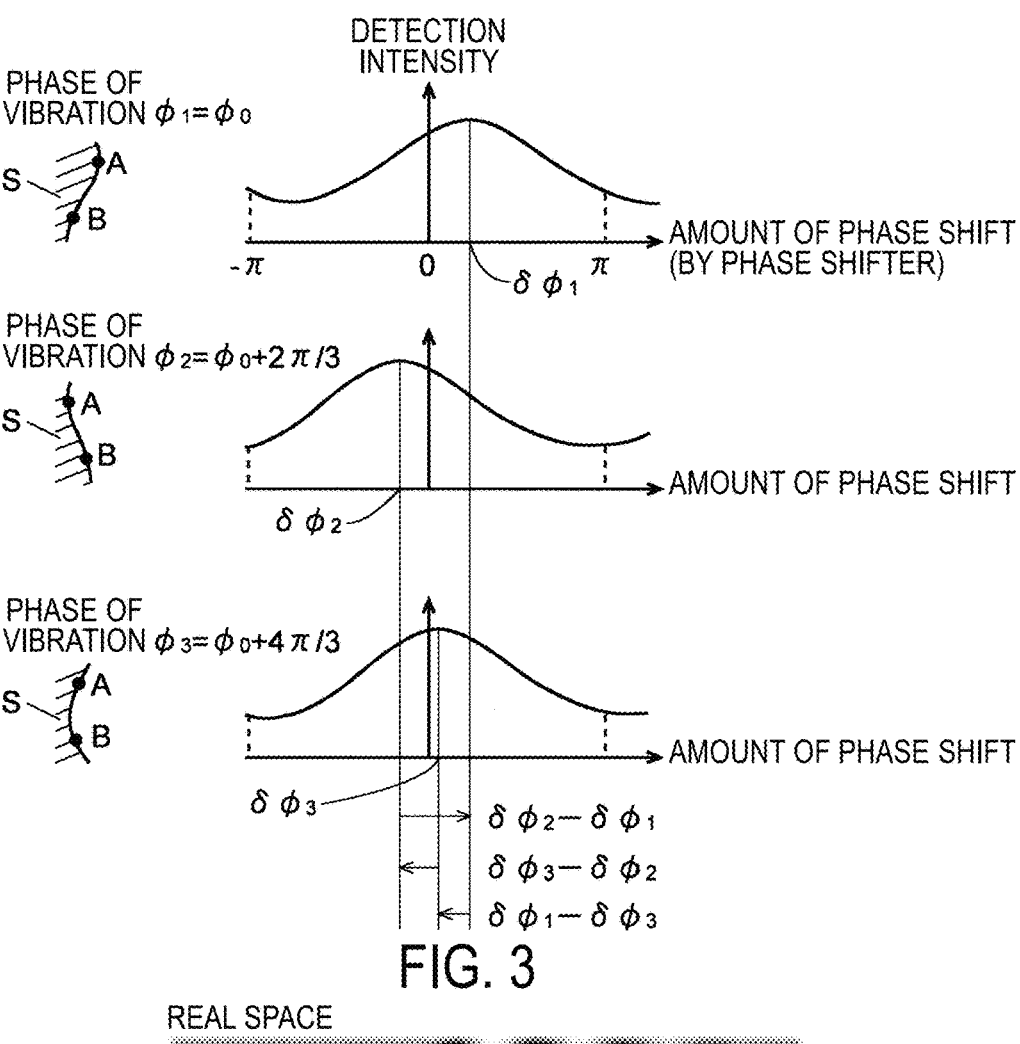
FIG. 3 is a diagram for explaining a method for determining the displacement of the surface of a test object in the defect detection device according to the present embodiment.

While the illumination light, which is a pulsed laser light, is repeatedly emitted, the phase shifter 153 is operated to gradually change (shift) the phase of the illumination light passing through the phase shifter 153 (i.e., the illumination light reflected by point A). Consequently, the phase difference between the illumination light reflected by point A and the one reflected by point B gradually changes. During this change, each detection element of the image sensor 155 detects the interference light resulting from the interference of the two rays of illumination light and determines its intensity (Step S5). The upper diagram in FIG. 3 graphically shows one example of the amount of phase shift by the phase shifter 153 and the intensity of the interference light detected with a detection element of the image sensor 155 when the phase of the vibration of the vibrator 12 is $\phi_1$. In FIG. 3, the relationship in which the detection intensity sinusoidally changes with respect to the amount of phase shift is represented by a continuous curve. However, the actually observed data are in a discrete form, and the continuous sinusoidal wave is reproduced from the observed data by the least-square method or other appropriate methods. To this end, it is necessary to detect the intensity with at least three different amounts of phase shift ($k_{max} \geq 3$).

The operations of Steps S4 and S5 are similarly performed for each value of k from 2 to $k_{max}$ (i.e., after the determination result in Step S6 has been "NO", the value of k is increased by one in Step S7, and the operations of Steps S4 and S5 are once more performed). For example, in the case of $k_{max}=3$, the signal generator 11 sends a pulse signal to the pulse laser light source 13 at each timing when the phase of the elastic wave is equal to $\phi_2=\phi_0+2\pi/3$ (when k=2) or $\phi_3=\phi_0+4\pi/3$ (when k=3), whereby the illumination light is repeatedly cast onto the entire measurement area on the surface of the test object S. Meanwhile, the phase shifter 153 gradually shifts the phase of the illumination light passing through itself, and each detection element of the image sensor 155 detects the intensity of the interference light. The middle and lower diagrams in FIG. 3 graphically show examples of the relationship between the amount of phase shift and the intensity of the interference light when the phase of the vibration of the vibrator 12 is $\phi_2$ (middle diagram) or $\phi_3$ (lower diagram) in the case of $k_{max}=3$.

After the operations of Steps S4 and S5 have been performed for all values of k from 1 to $k_{max}$ in the previously described manner (and the determination result in Step S6 has been "YES"), the displacement calculator 163 determines, for each detection element of the image sensor 155 and for each phase $\phi_1$ to $\phi_{max}$ of the vibration, the maximum output phase shifts $\delta\phi_1$ to $\delta\phi_{max}$ at which the output of the detection element is maximized within the period in which the amount of phase shift was changed by the phase shifter 153. Based on those maximum output phase shifts, the displacement calculator 163 determines the difference in maximum output phase shift between each different pair of the phases of the vibration. For example, in the case of $k_{max}=3$, three values of the difference in maximum output phase shift are obtained, i.e., $(\delta\phi_2-\delta\phi_1)$, $(\delta\phi_3-\delta\phi_2)$ and $(\delta\phi_1-\delta\phi_3)$. Those differences in maximum output phase shift show three (or more) relative displacements of points A and B in the off-plane direction by means of three (or more) sets of data obtained at different phases of the vibration of the vibrator 12 (i.e., at different points in time). Based on these three (or more) relative displacements, the values of the following three parameters showing the vibration state of the test object S can be obtained for each point within the measurement area: the amplitude of the vibration, phase of the vibration, and central value (DC component) of the vibration.

Figure 4:
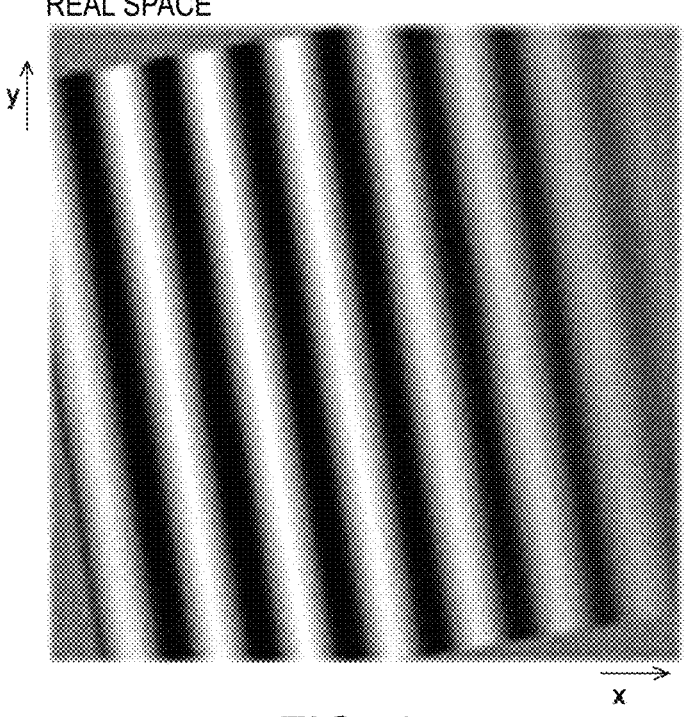
FIG. 4 is an image showing one example of the waveform of an elastic wave in a real space, obtained by the defect detection device according to the present embodiment.

Given these three parameters, it is possible to accurately reproduce the state of vibration at each point. Accordingly, based on the three aforementioned parameters, the displacement in the off-plane direction (the elevation of the surface) at a specific point in time is numerically determined at each position in the real space (Step S8, which means the completion of the vibration state measurement process mentioned earlier). The magnitude of the numerical value of the displacement in the off-plane direction at each position on the surface of the test object S is represented by a grayscale value to obtain an image showing the vibration state (FIG. 4). The light and dark stripes formed as in FIG. 4 demonstrate that a waveform is created on the surface of the test object S. A comparatively simple waveform is created in the example of FIG. 4. However, in many cases, a complex waveform results due to the reflection of the elastic wave at the ends of the test object S or for other reasons. It is impossible for an operator to visually determine the wavelength of the induced elastic wave from an image showing such a complex waveform.

Accordingly, the judgment-index-value determiner 164 performs fast Fourier transform using the numerical value of the displacement obtained for each position in the real space to calculate the strength value of the vibration for each vector-valued wavenumber (Step S9). It should be noted that the numerical value of the displacement obtained at each position in the real space is a complex number, and the fast Fourier transform in Step S9 may use the entire numerical value of that complex number, or it may only use the real part of the complex number. The use of the entire complex number is advantageous in that a more accurate strength value of the vibration can be determined for each vector-valued wavenumber. The use of only the real part is advantageous in that the computation load of the fast Fourier transform can be reduced, and the calculation can be performed at a higher speed.

Figure 5:
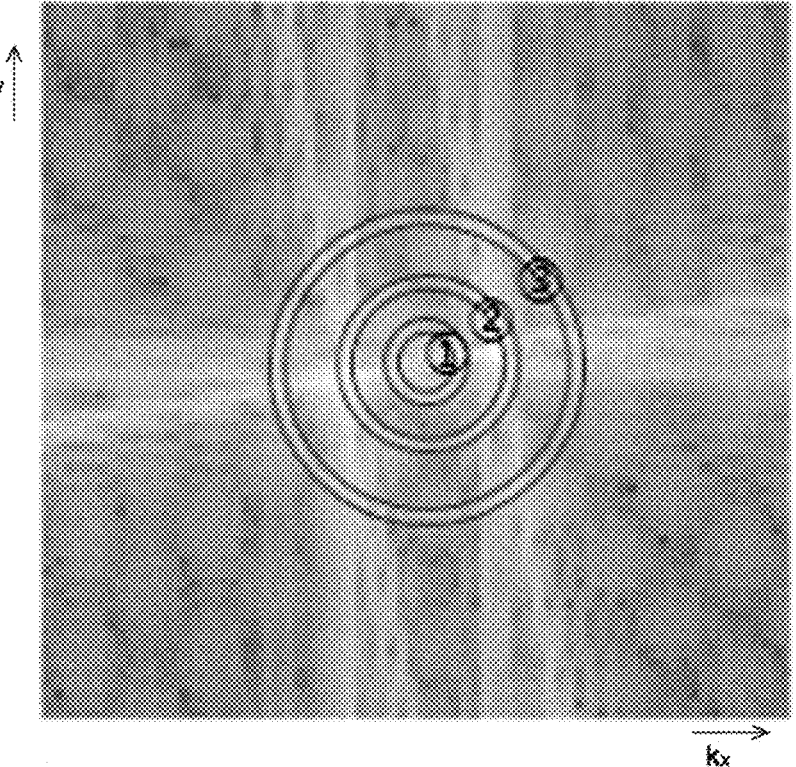
FIG. 5 is an image showing an example of the strength value of the vibration of each vector-valued wavenumber, obtained by the defect detection device according to the present embodiment.

Then, the magnitude of each strength value obtained in Step S9 is represented by a grayscale value on a two-dimensional wavenumber space in which one axis represents one component $k_x$ in the two-dimensional vector-valued wavenumber (the component of the wavenumber in the x direction in the real space) and the other axis represents the other component $k_y$ (the component of the wavenumber in the y direction), whereby an image showing the vibration state in the wavenumber space is obtained (FIG. 5).

In FIG. 5, elastic waves having the same wavelength (wavenumber) yet travelling in different directions will have their respective strengths indicated at different positions (i.e., at different vector-valued wavenumbers). However, what is necessary for the defect detection device and method according to the present embodiment is to compare the magnitude of the wavelength of the elastic wave created in the test object S with the size of the defect which is expected to be present in the test object S. Therefore, it is insignificant to determine the difference which depends on the travelling direction of the elastic wave. What is rather important is to determine the wavelength of the elastic wave regardless of the travelling direction of the elastic wave.

Figure 6:
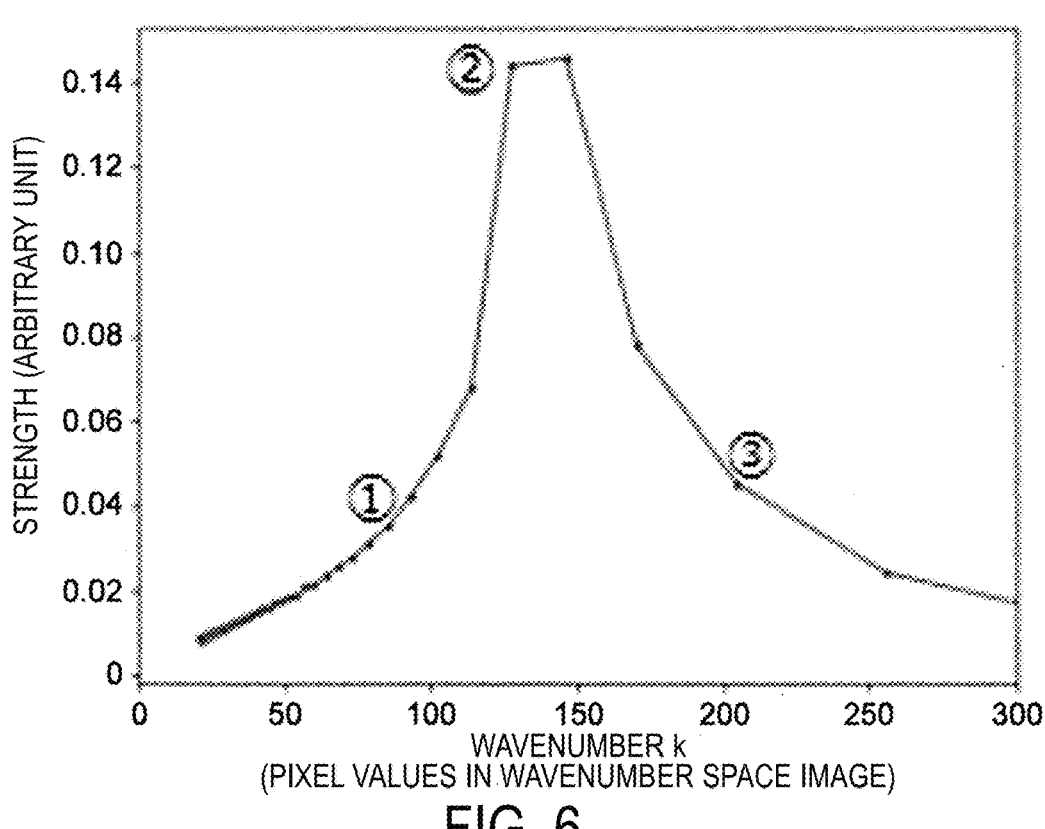
FIG. 6 is a graph showing the relationship between the scalar-valued wavenumber and the strength value (judgment index value), obtained by the defect detection device according to the present embodiment.

Accordingly, the judgment-index-value determiner 164 additionally determines, as the judgment index value, the strength value for each scalar-valued wavenumber by totaling the strength values obtained in Step S9 for each vector-valued wavenumber and at the same distance from the origin of the two-dimensional wavenumber vector space (Step S10). FIG. 5 shows an example, in which the strength values are totaled on the circumference of each of the circles labeled "1" through "3". The diameter of each circle represents the wavenumber of the points on the circumference of that circle. The totalization is carried out on each of a large number of circles which are all centered on the origin. The judgment index value thus determined for each scalar-valued wavenumber can be represented by a graph, an example of which is shown in FIG. 6. In FIG. 6, the horizontal axis indicates the pixel value on the image shown in FIG. 5 (which corresponds to the length in the same image). This value corresponds to the scalar-valued wavenumber on a one-to-one basis. Therefore, the scalar-valued wavenumber can be determined from the pixel value.

The wavenumber determiner 165 determines the wavenumber at which the strength value obtained for each scalar-valued wavenumber in Step S10 has the largest value, as the wavenumber of the elastic wave induced in the test object S (Step S11). In the graph of FIG. 6, the wavenumber at which the strength reaches its peak corresponds to the wavenumber of the elastic wave.

The display processor 166 performs a control for displaying the wavelength, i.e., the reciprocal of the wavenumber of the elastic wave obtained in Step S11, on the display unit 19 (Step S12). Additionally, the display processor 166 also performs a control for displaying, on the display unit 19, the image showing the vibration state in the real space (FIG. 4), the image showing the strength distribution in the two-dimensional wavenumber space (FIG. 5) and the judgment index value of each scalar-valued wavenumber (FIG. 6).

From the wavelength of the elastic wave displayed on the display unit 19 and the size of the defect expected to be present in the test object S, the operator determines whether or not the wavelength of the elastic wave is within an appropriate range (Step S13). This determination may alternatively be performed by a determiner 167 (indicated by the broken line in FIG. 1) in the measurement control unit 16 in place of the operator, in which case the operator using the input unit 18 enters the expected size of the defect, and the determiner 167 makes the aforementioned determination based on a predetermined criterion (e.g., whether or not the expected size of the defect divided by the wavelength of the elastic wave is within a predetermined range).

When the determination result in Step S13 has been "NO", i.e., when the wavelength of the elastic wave is not within the appropriate range, the frequency f is modified in Step S14. Specifically, the operator using the input unit 18 enters a new value of frequency f (or the frequency controller 162 sets a new value of frequency f in the case where the determination is made by the determiner 167), and subsequently, Steps S2 through S13 are performed once more.

On the other hand, when the determination result in Step S13 has been "YES", i.e., when the wavelength of the elastic wave is within the appropriate range, the operator performs the task of detecting a defect formed in the test object S from the image showing the vibration state in the real space displayed on the display unit 19 (Step S15). It is easy to detect a defect since the wavelength of the elastic wave has been appropriately set by the foregoing operations of Steps S2 through S13 so that the wavelength is neither too long as compared to the size of the defect (the defect is not entirely included in one peak or trough of the elastic wave) nor too short (the amplitude of the elastic wave is not too low). With the operations described thus far, the entire operation of the defect detection device 10 according to the present embodiment and the defect detection method according to the present embodiment is completed.

(3) Modified Examples

The present invention is not limited to the previous embodiment but can be modified in various forms.

Figure 7:
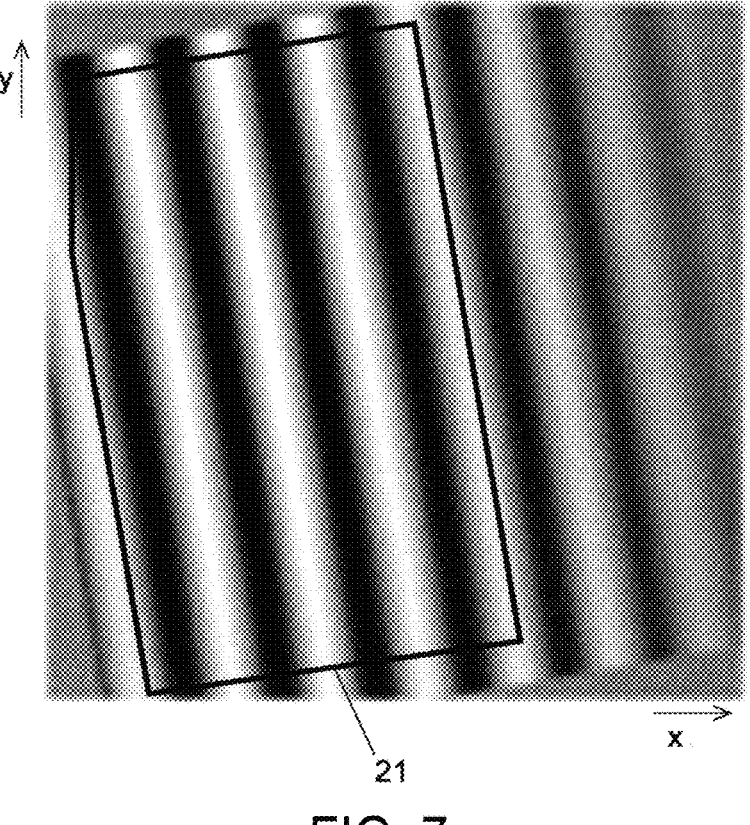
FIG. 7 is an image showing an example of the setting of a wavelength determination target area within an image of the waveform of an elastic wave.
Figure 8:
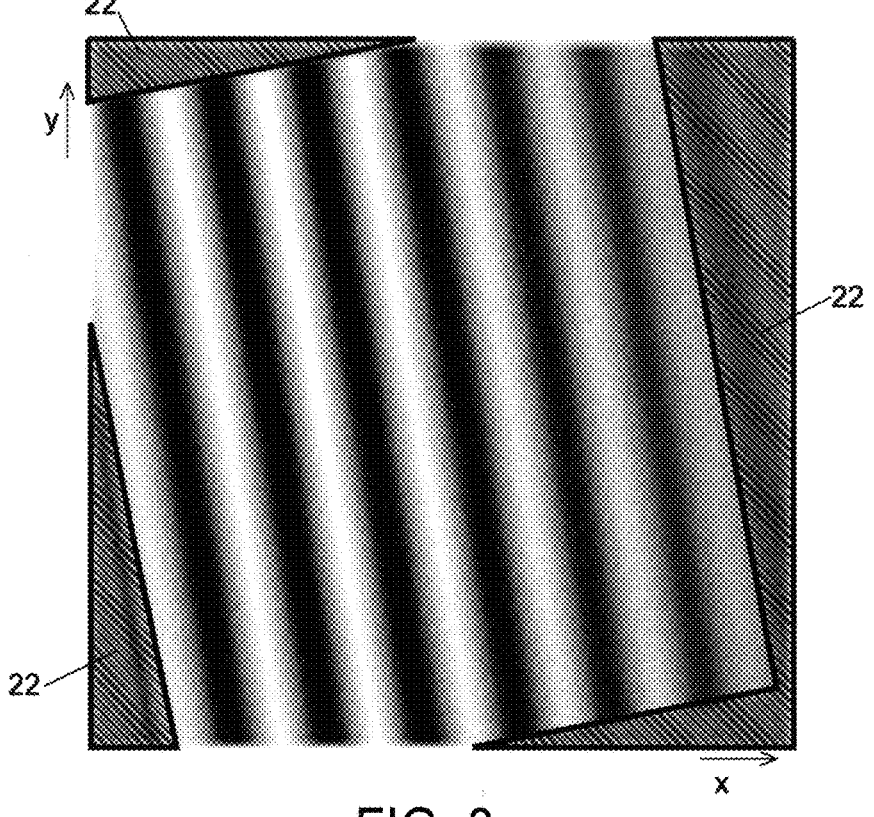
FIG. 8 is an image showing an example of the setting of an area to be excluded from the wavelength determination within an image of the waveform of an elastic wave.

For example, the Fourier transform in the previous embodiment was performed on the entire area shown in the image obtained in the real space. Alternatively, as shown in FIG. 7, the operator using the input unit 18 may set a wavelength determination target area 21 within the image, and only the numerical values showing the vibration state within the wavelength determination target area 21 may be used for the Fourier transform. It is also possible for the operator using the input unit 18 to set, as shown in FIG. 8, one or more areas 22 to be excluded from the wavelength determination, instead of setting the wavelength determination target area 21, and the area of the image exclusive of those areas 22 may be set as the wavelength determination target area. The setting of the wavelength determination target area 21, or the areas 22 to be excluded from the wavelength determination, can be performed in a commonly known method for setting a desired area in an image using a mouse, touch panel or similar device. The setting of those areas is performed under the control of a wavelength determination target area setter 168 provided in the measurement control unit 16 of the defect detection device 10 (as indicated by the broken line in FIG. 1).

By setting the wavelength determination target area in this manner, the wavelength of the elastic wave created in the test object S can be appropriately determined by excluding unnecessary portions external to the test object S when something external to the test object S is included in the image.

In the previous embodiment, only the wavenumber at which the judgment index value has the largest value is determined as the wavenumber of the elastic wave induced in the test object S. If there are different materials at different positions in the same test object S, the wavenumber of the elastic wave changes depending on the position, and the judgment index value will have a plurality of local maxima. Furthermore, the test object S may be made of a material in which the wavenumber (wavelength) of the elastic wave varies depending on the travelling direction, in which case the judgment index value will have a plurality of local maxima when an elastic wave that travels in a plurality of different directions is induced in the test object S. In those cases, the wavenumber determiner 165 may preferably determine, as the wavenumbers of the elastic wave, not only the wavenumber at which the judgment index value has the largest value but also other wavenumbers at which the judgment index value has local maxima. This allows for the determination on whether or not the elastic wave induced in the test object S has an appropriate wavelength across the entire measurement area.

For the measurement of the vibration state of the test object S, a speckle interferometer or other appropriate types of measurement devices may be used in place of the speckle-shearing interferometer 15 used in the previous embodiment.

MODES

It is evident for a person skilled in the art that previously described illustrative embodiment is a specific example of the following modes of the present invention.
(Clause 1)

A defect detection device according to the present invention includes:

an exciter configured to give a test object a vibration with a variable frequency;

a vibration state measurer configured to perform a measurement of a vibration state of the surface of the test object by an optical means while the vibration is given to the test object, and to determine, for each position on the surface, a numerical value representing the vibration state based on a result of the measurement;

a judgment-index-value determiner configured to determine a judgment index value by Fourier transform based on the numerical value representing the vibration state at each position, where the judgment index value is a numerical value representing the strength of the vibration for each wavenumber; and a wavenumber-wavelength determiner configured to determine, based on the judgment index value determined for each wavenumber, a wavenumber or wavelength of an elastic wave induced in the test object by the vibration given to the test object.

(Clause 6)

A defect detection method according to the present invention includes:

a vibration-giving process for giving a test object a vibration of a predetermined frequency;

a vibration state measurement process for performing a measurement of a vibration state of the surface of the test object by an optical means while the vibration is given to the test object, and for determining, for each position on the surface, a numerical value representing the vibration state based on a result of the measurement;

a judgment-index-value determination process for determining a judgment index value by Fourier transform based on the numerical value representing the vibration state at each position, where the judgment index value is a numerical value representing the strength of the vibration for each wavenumber;

a wavenumber-wavelength determination process for determining, based on the judgment index value determined for each wavenumber, a wavenumber or wavelength of the elastic wave induced in the test object by the vibration given to the test object; and a determination process for determining whether or not the wavenumber or wavelength determined in the wavenumber-wavelength determination process is within an appropriate range, based on the wavenumber or wavelength as well as the size of a defect expected to be present in the test object, where, when it is determined in the determination process that the wavenumber or wavelength is not within an appropriate range, the aforementioned processes are once more performed after the frequency is changed.

In the defect detection device according to Clause 1 and the defect detection method according to Clause 6, a numerical value representing the vibration state is determined for each position on the surface of the test object. Based on the numerical value thus determined for each position, a judgment index value which is a numerical value representing the strength of the vibration for each wavenumber is determined. Based on the judgment index value thus determined for each wavenumber, the wavenumber of the elastic wave induced in the test object (e.g., the wavenumber at which the judgment index value is has the largest value), or a wavelength which is the reciprocal of that wavenumber, is determined. By this method, the wavenumber or wavelength of the elastic wave can be easily determined regardless of the form of the elastic wave created in the test object. When the wavenumber or wavelength of the elastic wave thus determined is within an appropriate range, a defect can be correctly detected from the vibration state of the surface of the test object produced by the elastic wave having that wavenumber or wavelength. When the wavenumber or wavelength of the elastic wave thus determined is not within the appropriate range, the frequency of the vibration given to the test object can be modified so that the wavenumber or wavelength will be within the appropriate range and the defect will be correctly detected.

(Clause 2)

In the defect detection device according to Clause 2, which is one mode of the defect detection device according to Clause 1, the judgment-index-value determiner is configured to determine the judgment index value for each scalar-valued wavenumber.

The numerical value representing the vibration state is determined for each position on the surface of the test object, i.e., for each two-dimensional position. Therefore, a Fourier transform based on this numerical value yields a numerical value of the strength for each position on a two-dimensional wavenumber space. In other words, the strength is determined for each wavenumber expressed as a vector value. On the other hand, the index necessary for judging whether or not the number of vibrations given to a test object is appropriate with respect to the size of a defect is a scalar-valued wavelength (information of the direction within the two-dimensional space is unnecessary), or a scalar-valued wavenumber, which is the reciprocal of the wavelength. Accordingly, in the defect detection device according to Clause 2, the judgement index value is determined for each scalar-valued wavenumber, whereby the information necessary for determining whether or not the number of vibrations is appropriate can be easily obtained.

(Clause 3)

The defect detection device according to Clause 3, which is one mode of the defect detection device according to Clause 1 or 2, further includes:

an image displayer configured to display an image showing the vibration state, based on the numerical value representing the vibration state determined for each of the plurality of positions on the surface; and a wavelength determination target area setter configured to set a wavelength determination target area within the image displayed by the image displayer, where the judgment-index-value determiner is configured to perform the Fourier transform based on the numerical value representing the vibration state at each position within the wavelength determination target area.

In the defect detection device according to Clause 3, when something external to the test object is included in the image, the wavelength determination target area can be set so as to exclude unnecessary portions external to the test object from the target area, so that the wavelength of the elastic wave created in the test object within the wavelength determination target area can be appropriately determined.

The setting of the wavelength determination target area includes not only the case where an operator directly selects the wavelength determination target area within the image by a predetermined operation, but also the case where the operator performs an operation for setting an area to be excluded from the wavelength determination within the image, and a computer subsequently sets the wavelength determination target area exclusive of the aforementioned area to be excluded from the wavelength determination.

(Clause 4)

In the defect detection device according to Clause 4, which is one mode of the defect detection device according to one of Clauses 1-3, the wavenumber or wavelength determined by the wavenumber-wavelength determiner includes not only a wavenumber or wavelength at which the judgment index value has the largest value, but also another wavenumber or wavelength at which the judgment index value has a local maximum.

In the defect detection device according to Clause 4, when a plurality of elastic waves which are different from each other in wavenumber or wavelength are induced in the same test object due to the presence of different materials at different positions in the test object, or when a plurality of elastic waves which are different from each other in wavenumber or wavelength are induced depending on the travelling direction of each elastic wave, the plurality of different wavenumbers or wavelengths of those elastic waves can be presented to the operator. This allows the operator to determine whether or not the elastic wave induced in the test object has an appropriate wavelength across the entire measurement area.

(Clause 5)

In the defect detection device according to Clause 5, which is one mode of the defect detection device according to one of Clauses 1-4, the judgment-index-value determiner is configured to perform the Fourier transform using a complex number as the numerical value representing the vibration state at each position.

In the defect detection device according to Clause 5, the use of the complex number as the numerical value representing the vibration state at each position enables a more accurate determination of the strength value of the vibration of each wavenumber than in the case of performing the Fourier transform using only the real part of the numerical value.

What is claimed is:

1. A defect detection device, comprising:
an exciter configured to give a test object a vibration of a predetermined frequency;
a vibration state measurer configured to perform a measurement of a vibration state of a measurement area on a surface of the test object by an optical means while the vibration is given to the test object, and to determine, for each position on the surface, a numerical value representing the vibration state based on a result of the measurement;
a judgment-index-value determiner configured to determine a judgment index value by performing Fourier transform on an entire area of the measurement area based on the numerical value representing the vibration state at each position, where the judgment index value is a numerical value representing a strength of the vibration for each wavenumber; and
a frequency controller configured to set the predetermined frequency,
wherein a wavenumber or wavelength of an elastic wave induced within the entire area of the measurement area in the test object by the vibration given to the test object is determined based on a comparison of each of the judgment index value determined for each wavenumber,
wherein the frequency controller changes the predetermined frequency based on the determined wavenumber or wavelength.

2. The defect detection device according to claim 1, wherein the judgment-index-value determiner is configured to determine the judgment index value for each scalar-valued wavenumber.

3. The defect detection device according to claim 1, further comprising:
a display device configured to display an image showing the vibration state, based on the numerical value representing the vibration state determined for each position on the surface; and
a wavelength determination target area setter configured to set a wavelength determination target area within the image displayed by the display device,
wherein the judgment-index-value determiner is configured to perform the Fourier transform based on the numerical value representing the vibration state at each position within the wavelength determination target area.

4. The defect detection device according to claim 1, wherein the determined wavenumber or wavelength includes not only a wavenumber or wavelength at which the judgment index value has a largest value, but also another wavenumber or wavelength at which the judgment index value has a local maximum.

5. A defect detection method, comprising:
a vibration-giving process for giving a test object a vibration of a predetermined frequency;
a vibration state measurement process for performing a measurement of a vibration state of a measurement area on a surface of the test object by an optical means while the vibration is given to the test object, and for determining, for each position on the surface, a numerical value representing the vibration state based on a result of the measurement;
a judgment-index-value determination process for determining a judgment index value by performing Fourier transform on an entire area of the measurement area based on the numerical value representing the vibration state at each position, where the judgment index value is a numerical value representing a strength of the vibration of each wavenumber;
a wavenumber-wavelength determination process for determining, based on a comparison of each of the judgment index value determined for each wavenumber, a wavenumber or wavelength of an elastic wave induced within the entire area of the measurement area in the test object by the vibration given to the test object; and
a determination process for determining whether or not the wavenumber or wavelength determined in the wavenumber-wavelength determination process is within a predetermined range, based on the wavenumber or wavelength as well as a size of a defect expected to be present in the test object,
wherein, when it is determined in the determination process that the wavenumber or wavelength is not within the predetermined range, the aforementioned processes are once more performed after the predetermined frequency is changed.

* * * * *